(12) United States Patent
Lo et al.

(10) Patent No.: US 10,594,517 B1
(45) Date of Patent: Mar. 17, 2020

(54) CHANNEL ESTIMATION SYSTEM AND METHOD THEREOF

(71) Applicant: WISTRON NEWEB CORPORATION, Hsinchu (TW)

(72) Inventors: Hsin-Yuan Lo, Hsinchu (TW); Shang-Ho Tsai, Hsinchu (TW); Shoou-Hann Huang, Hsinchu (TW); Chun-Hsiung Chuang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 16/171,751

(22) Filed: Oct. 26, 2018

(51) Int. Cl.
*H04L 25/02* (2006.01)
*H04B 7/06* (2006.01)
*H04B 7/0413* (2017.01)

(52) U.S. Cl.
CPC ......... *H04L 25/021* (2013.01); *H04B 7/0617* (2013.01); *H04L 25/0204* (2013.01); *H04L 25/0242* (2013.01); *H04B 7/0413* (2013.01)

(58) Field of Classification Search
CPC .............. H04L 25/021; H04L 25/0204; H04L 25/0242; H04L 5/0048; H04L 5/0023; H04W 72/0413; H04W 72/046; H04B 7/0617; H04B 7/0413; H04B 7/0404; H04B 7/0697; H04B 7/0456
USPC ........................................................ 370/329
See application file for complete search history.

(56) References Cited

U.S. PATENT DOCUMENTS

| | | | | |
|---|---|---|---|---|
| 2015/0124738 A1* | 5/2015 | Ramakrishna | ........ | H04L 5/0048 370/329 |
| 2016/0211898 A1* | 7/2016 | Cai | ...................... | H04B 7/0617 |
| 2016/0302146 A1* | 10/2016 | Rangan | ............. | H04W 52/0209 |
| 2018/0063883 A1* | 3/2018 | Nagaraja | ............... | H04W 76/28 |
| 2018/0070363 A1* | 3/2018 | Chakraborty | ....... | H04W 72/048 |
| 2018/0248596 A1* | 8/2018 | Xiao | .................... | H04B 7/0456 |
| 2019/0123789 A1* | 4/2019 | Li | ......................... | H04B 7/0626 |
| 2019/0222279 A1* | 7/2019 | Xi | .......................... | H04B 7/024 |

OTHER PUBLICATIONS

A.Ghosh et al. "Millimeter-Wave Enhanced Local Area Systems: A High-Data-Rate Approach for Future Wireless Network", IEEE JSAC, Jun. 2014. (Year: 2014).*
Alkhateeb et al., "Hybrid Pre-coding for Millimeter Wave Cellular Systems with Partial Channel Knowledge, Proc.2013 IEEE Workshop on Information Theory and Applications". 2013 (Year: 2013).*
Klaus Hugl, et al. "Spatial Reciprocity of Uplink and Downlink Radio Channels in FDD Systems", European Cooperation in the Field of Scientific and Technical Research, May 30, 2002-May 31, 2002, EURO-COST, Espoo, Finland.
Steven M. Kay, "Fundamentals of Statistical Signal Processing: Estimation Theory", p. 325-328, Prentice-Hall, A Simon & Schuster Company, Englewood Cliffs, New Jersey, 1993.

* cited by examiner

*Primary Examiner* — Afsar M Qureshi
(74) *Attorney, Agent, or Firm* — Li & Cai Intellectual Property (USA) Office (57) ABSTRACT

A channel estimation system and method thereof is provided. By utilizing the nature of the millimeter-wave channel with sparse path, the channel estimation problem is transformed from estimating the entire channel matrix to estimating independent parameters of the millimeter-wave channel. These parameters are angle of arrival (AoA) and angle of departure (AoD), and complex gain of the channel paths.

26 Claims, 8 Drawing Sheets

CHANNEL ESTIMATION SYSTEM AND METHOD THEREOF

FIELD OF THE DISCLOSURE

The present disclosure relates to a channel estimation system and method thereof, and more particularly to a channel estimation system and method transforming the channel estimation problem from estimating the entire channel matrix to estimating independent parameters of the millimeter-wave channel by using the nature of the millimeter-wave channel with sparse paths.

BACKGROUND OF THE DISCLOSURE

Today's communication systems are approaching the maximum threshold that can be used in terms of bandwidth size or data throughput. To further improve channel capacity, it is necessary to resort to higher frequency electromagnetic wave bands, which makes the millimeter-wave communication an important development direction for future mobile communication, because its large frequency band will bring more ideal channel capacity, which will make the transmission of large amounts of data feasible, and many communication specification, such as fifth generation mobile communication, vehicle detection radar, etc. to be developed.

However, the millimeter wave will withstand the high air loss effect at high frequencies (above 30 GHz), so that the transmission signal will have a serious loss in a short distance, and the ideal signal noise ratio cannot be obtained at the receiving end (Signal to noise ratio), here, the millimeter wave communication system needs to use beamforming technology (Beamforming) to obtain sufficient antenna gain to resist large air loss in high frequency, thereby effectively improving the signal noise at the receiving end.

However, beamforming technology requires accurate channel information to synthesize an ideal precoder. With accurate channel information, the base station can perform transmission power allocation and determine which path is preferably for data transmission. Therefore, the millimeter wave channel estimation method is an indispensable important technology.

The millimeter wave communication system uses a massive multiple input multiple output (MIMO) system, and a large number of tiny antennas are deployed at the transmitting end and the receiving end. In the existing communication system, each antenna is equipped with a set of independent RF chains and digital/analog (D/A) converter for fully digital beamforming. However, it is not practical to deploy the same hardware architecture on the millimeter wave communication system. A large number of RF chains and D/A converters will greatly increase the hardware cost of the system. Therefore, the millimeter wave communication system adopts hybrid beamforming technology, the number of RF chains and D/A converters in this architecture is much smaller than the number of antennas, and each antenna is equipped with a phase shifter to reduce costs with this hybrid hardware architecture while approaching the fully digital beamforming technology in performance. The hybrid system is quite different from the previous fully digital beamforming architecture, and thus different method for processing the channel estimation is utilized.

Moreover, the dimensions of the millimeter-wave channel matrix are much larger than in the previous communication systems, and the distribution of the channel paths is rather sparse due to the high air loss characteristics of the high-frequency electromagnetic waves, and thus objects that actually reflect and scatter the path of the channels are relatively rare. These characteristics make the channel estimation method in the existing communication system no longer meet requirements for the actual application. However, the existing scheme is not ideal in the training overhead and feedback numbers of channel estimation information, and therefore the process of estimating the channel will consume a certain amount of resources.

SUMMARY OF THE DISCLOSURE

In response to the above-referenced technical inadequacies, the present disclosure provides a channel estimation system and method thereof, using the nature of the millimeter-wave channel with sparse path, the channel estimation problem is transformed from estimating the entire channel matrix to estimating independent parameters of the millimeter-wave channel. These parameters are angle of arrival (AoA) and angle of departure (AoD), and complex gain of the channel paths.

In one aspect, the present disclosure provides a channel estimation system, including a first transceiver and a second transceiver. The first transceiver includes a first baseband circuitry and a plurality of first antennas, configured to transmit a downlink omnidirectional signal with one of the plurality of first antennas. The second transceiver includes a plurality of second antennas, a RF chain circuit, and a second baseband circuitry. The plurality of second antennas configured to receive the downlink omnidirectional signal, the RF chain circuit coupled to the plurality of first antennas, the second baseband circuitry coupled to the RF chain circuit, and the first baseband circuitry and the second baseband circuitry are configured to estimate channels by performing the following steps: obtaining first received signals by processing the downlink omnidirectional signal from the plurality of second antennas; generating a plurality of receiving array responses corresponding to receiving angles in a determined range of angle, respectively; estimating an angle of arrival (AoA) by executing an AoA estimating algorithm, and the AoA estimating algorithm including: obtaining dot products of the plurality of receiving array responses and the first received signals, respectively; and selecting one of the receiving angles corresponding to a maximum value among the obtained dot products as the AoA; the RF chain circuit is further configured to estimate channels by performing the following steps: using a parameter-separated model to obtain channel complex gains from the first received signals; providing long-term statistic information associated to the channel complex gains according to structural parameters of the second transceiver; establishing a Bayesian Linear Estimator to estimate the channel complex gain; configuring the second transceiver to transmit an uplink omnidirectional signal with one of the plurality of second antennas; configuring the first transceiver to receive the uplink omnidirectional signal; obtaining second received signals by processing the downlink omnidirectional signal from the plurality of second antennas; generating a plurality of transmitting array responses corresponding to transmitting angles in the determined range of angle, respectively; estimating an angle of departure (AoD) by executing an AoD estimating algorithm, wherein the AoD estimating algorithm comprising: obtaining dot products of the plurality of transmitting array responses and the second received signals, respectively; and selecting one of the transmitting angles corresponding to a maximum value among the obtained dot products as the AoD; and obtaining a channel matrix according to the estimated AoA, the channel complex gain, and the estimated AoD.

In certain embodiments, the present disclosure provides a channel estimation method, including: configuring a plurality of first antennas of a first transceiver to transmit a downlink omnidirectional signal with one of the plurality of first antennas, and the first transceiver further includes a first baseband circuitry; configuring a plurality of second antennas of a second transceiver to receive the downlink omnidirectional signal, wherein the second transceiver further includes a RF chain circuit coupled to the plurality of first antennas, and a second baseband circuitry coupled to the RF chain circuit; configuring the first baseband circuitry and the second baseband circuitry to estimate channels by performing the following steps: obtaining first received signals by processing the downlink omnidirectional signal from the plurality of second antennas, generating a plurality of receiving array responses corresponding to receiving angles in a determined range of angle, respectively; estimating an angle of arrival (AoA) by executing an AoA estimating algorithm, wherein the AoA estimating algorithm including: obtaining dot products of the plurality of receiving array responses and the first received signals, respectively; and selecting one of the receiving angles corresponding to a maximum value among the obtained dot products as the AoA; using a parameter-separated model to obtain channel complex gains from the first received signals; providing long-term statistic information associated to the channel complex gains according to structural parameters of the second transceiver; establishing a Bayesian Linear Estimator to estimate the channel complex gain; configuring the second transceiver to transmit an uplink omnidirectional signal with one of the plurality of second antennas; configuring the first transceiver to receive the uplink omnidirectional signal; obtaining second received signals by processing the downlink omnidirectional signal from the plurality of second antennas, generating a plurality of transmitting array responses corresponding to transmitting angles in the determined range of angle, respectively; estimating an angle of departure (AoD) by executing an AoD estimating algorithm, wherein the AoD estimating algorithm including: obtaining dot products of the plurality of transmitting array responses and the second received signals, respectively; and selecting one of the transmitting angles corresponding to a maximum value among the obtained dot products as the AoD; and obtaining a channel matrix according to the estimated AoA, the channel complex gain, and the estimated AoD.

Therefore, the present disclosure provides a channel estimation system and method thereof, using the nature of the millimeter-wave channel with sparse paths, the channel estimation problem is transformed from estimating the entire channel matrix to estimating independent parameters of the millimeter-wave channel. These parameters are angle of arrival (AoA) and angle of departure (AoD), and complex gain of the channel paths.

Furthermore, the present disclosure provides a mathematical estimation model of separate parameters, which separates each parameter into an independent estimation type, that is, different parameters are not estimated in one stage, but are independently estimated in three stages, the first stage is to estimate the AoA of the channel, the second stage is to estimate the complex gain of the downstream channel path, and the last phase to estimate the AoD. Using the mathematical estimation model of separate parameters, the error of the joint estimation parameter can be avoided. In each stage, if the transmitted signal is adjusted by the appropriate signal-to-noise ratio (SNR Ratio), the estimation error of the channel parameters can be reduced to the ideal range. Furthermore, in order to save time of estimation, the present disclosure utilizes the reciprocal nature of uplink/downlink AoA and AoD of the millimeter-wave channel, that is, the AoA of uplink is the AoD of downlink, thereby reducing the amount of observational data to be collected and reducing the time spent on training.

In addition, the present disclosure designs the Bayesian Estimator by using the long-term statistic of channel path gain, and calculates the observational value by using back-end of the receiver, such that the feedback number of channel information can be effectively reduced to shorten the channel estimation time.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1A:
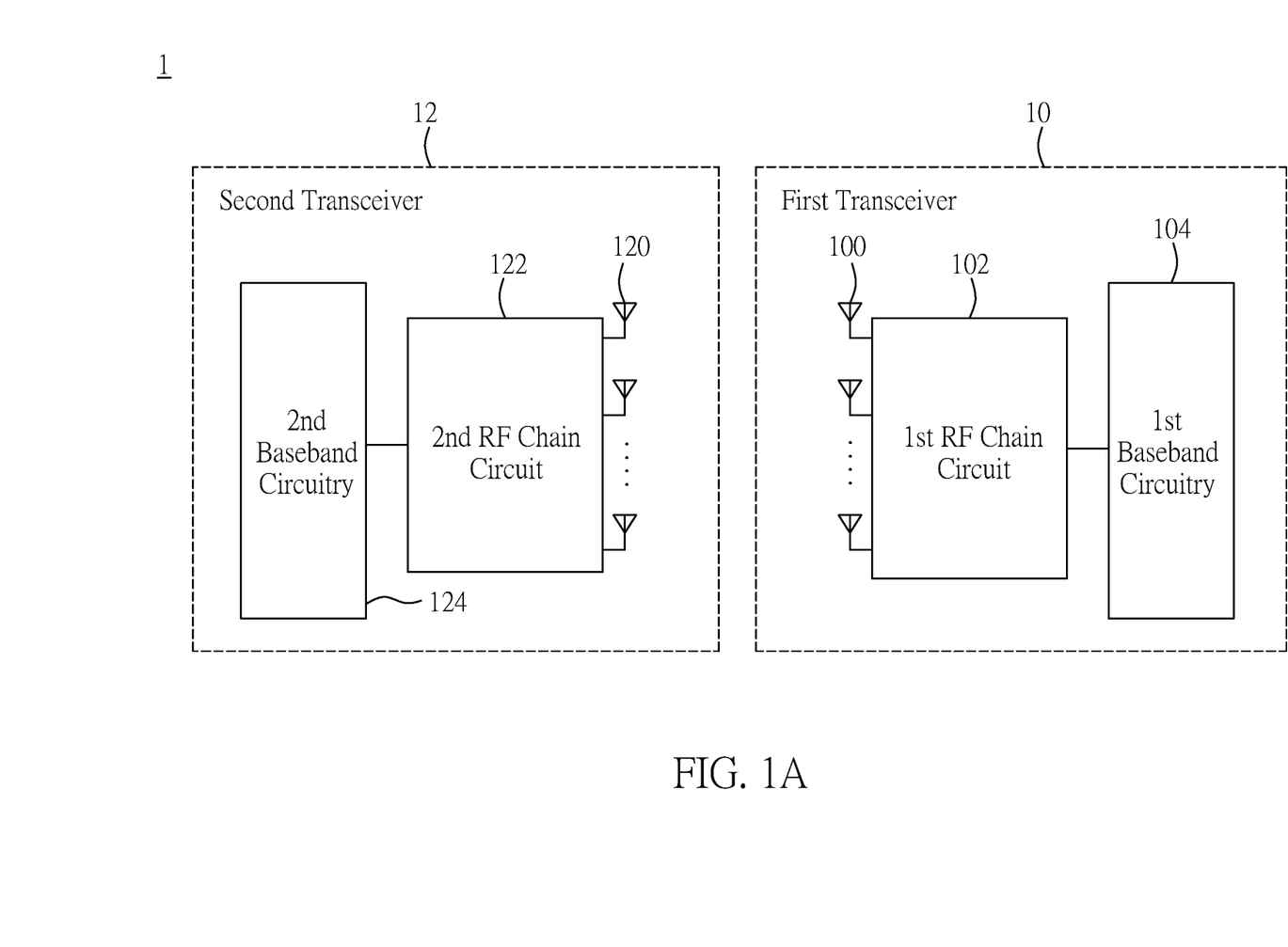
FIGS. 1A and 1B are block diagrams of a channel estimation system and a RF chain circuit thereof according to a first embodiment of the present disclosure.
Figure 1B:
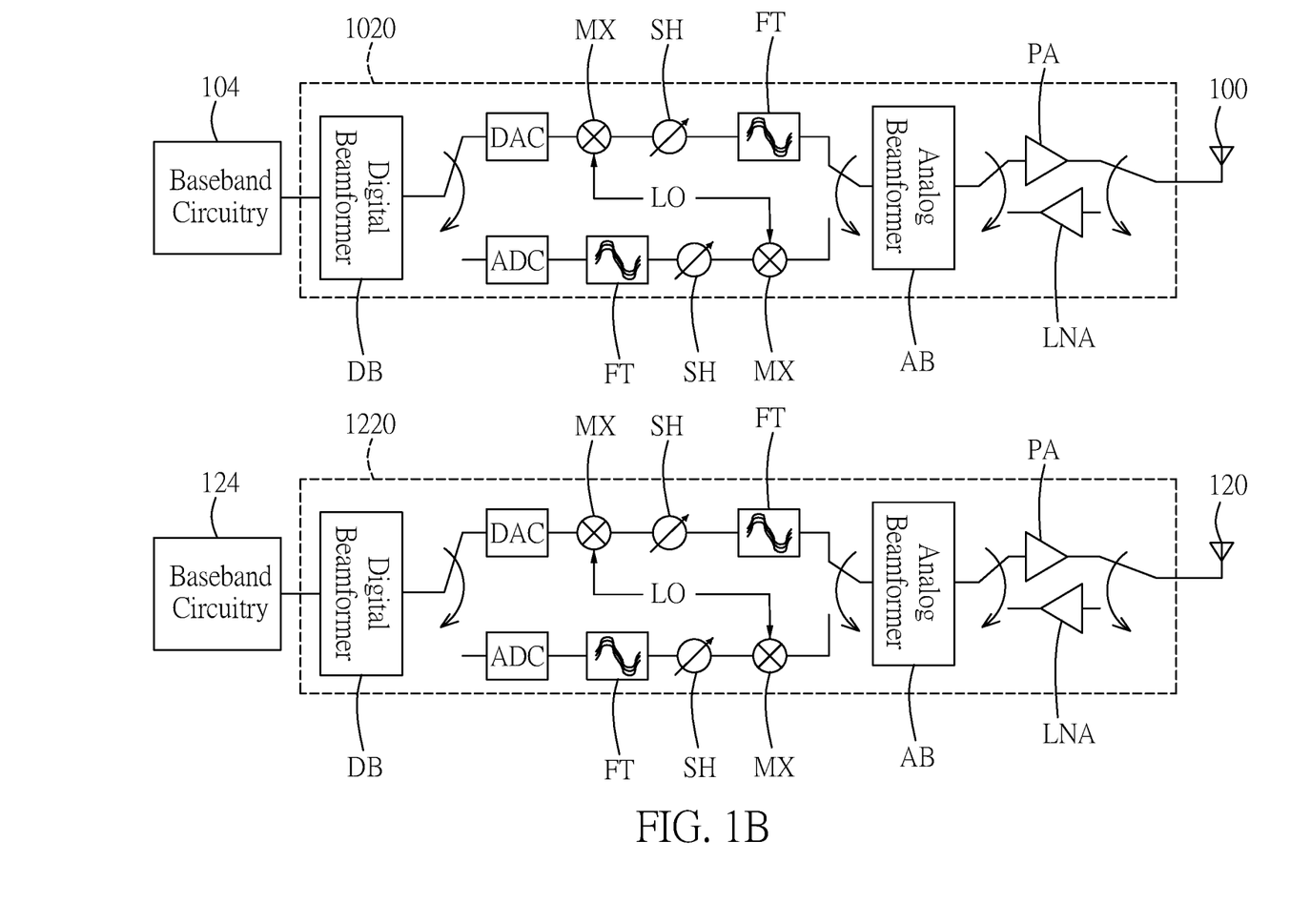

Reference is now made to FIGS. 1A and 1B, which are block diagrams of a channel estimation system and a RF chain circuit thereof according to a first embodiment of the present disclosure. As shown in FIG. 1A, the channel estimation system 1 includes a first transceiver 10 and a second transceiver 12. The first transceiver 10 includes a plurality of first antennas 100, a first RF chain circuit 102, and a first baseband circuit 104, and the first RF chain circuit 102 is coupled to the plurality of first antennas 100 and the first baseband circuit 104. Similarly, the second transceiver 12 includes a plurality of second antennas 120, a second RF chain circuit 122 and a second baseband circuitry 124, and the second RF chain circuit 122 is coupled to the plurality of second antennas 120 and the second baseband circuit 124.

The millimeter wave communication system utilizes a massive multiple input multiple output (massive MIMO) system, and a large number of antenna elements are provided at the transmitting end and the receiving end. In the present embodiment, each antenna, such as each of the first antennas 100 and the second antennas 120, is equipped with a set of independent RF chains and digital analog converter (D/A converter), thereby achieving a fully digital beamforming architecture.

As shown in FIG. 1B, the first RF chain circuit 102 for the fully digital beamforming architecture includes a plurality of first RF chain units 1020, and each of the first RF chain units 1020 may include a power amplifier PA, a low noise amplifier LNA, an analog beamformer, a pair of filters FT, a pair of phase shifters SH, a pair of filters FT, a pair of mixers MX receiving local oscillation signal LO, an analog to digital converter ADC, a digital to analog converter DAC, and a digital beamformer DB. A plurality of switches may further be provided in each of the first RF chain circuit unit 1020 for switching between a transmitting mode and a receiving mode. The second RF chain circuit 120 includes a plurality of second RF chain circuit units 1220, and may have similar structure as the first RF chain unit 1020, thus the repeated descriptions are omitted for clarify.

A universal narrow-band and clustered channel model may be utilized to accurately obtain the mathematical structure of the millimeter-wave channel. In the millimeter-wave channel model with clustered characteristics, a channel matrix H is composed of Ncl scatter clusters, and has $N_{ray}$ travel paths constitute these clusters. Therefore, a narrow-band channel matrix H of the discrete time domain can be presented as following equation:

$$H=\Sigma_{i,l}\alpha_{i,l}a_r(\phi_{il})a_t(\theta_{il})^H, [N_r,N_t]=\dim(H)$$

In the above equation, $\alpha_{il}$ is a channel complex gain of a lth path of an ith scattering group, $N_t$ is a number of the first antennas, $N_r$ is a number of the second antennas, $\phi_{il}$ is an angle of arrival (AoA), $\theta_{il}$ is an angle of departure (AoD), $a_r(\phi_{il})$ is a receiving array response, and $a_t(\theta_{il})$ is a transmitting array response, and the dimension of the $a_r(\phi_{il})$ and $a_t(\theta_{il})$ are $N_r \times 1$ and $N_t \times 1$, respectively. In a case of a uniform linear array antenna with averagely distributed N antenna elements, the array response vector can be expressed as following equation:

$$a_{ULA(\phi)} = \frac{1}{\sqrt{N}}[1, e^{jkd\sin(\phi)}, \ldots, e^{j(n-1)kd\sin(\phi)}]^T$$

Where $k=2\pi/\lambda$, $\lambda$ is the wavelength of the electromagnetic wave, d is the hardware spacing between the antenna elements.

In this case, the present disclosure provides a three-stage millimeter-wave channel estimation method. The first stage is to estimate the AoA of the downlink of the channel, and the second stage is to estimate the complex gain of the downlink channel using the Bayesian estimator according to long-term statistical characteristics of the given channel. Finally, the third stage utilizes reciprocal natures of the AoA and AoD of downlink and uplink of the millimeter-wave channel to estimate the downlink AoD. The three-stage estimation methods are described in detail hereinafter.

Figure 2A:
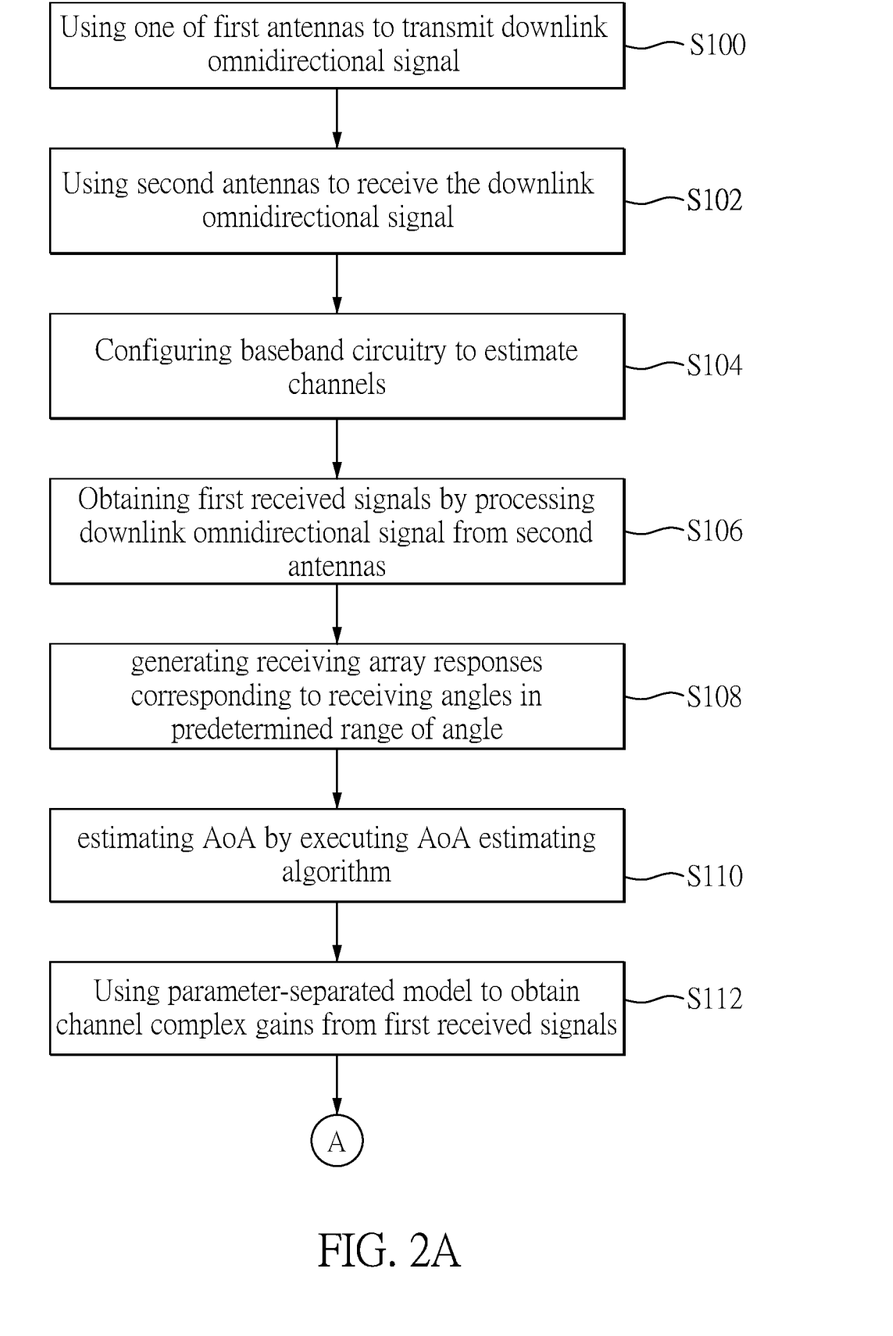
FIGS. 2A and 2B are flowcharts of a channel estimation method according to the first embodiment of the present disclosure.
Figure 2B:
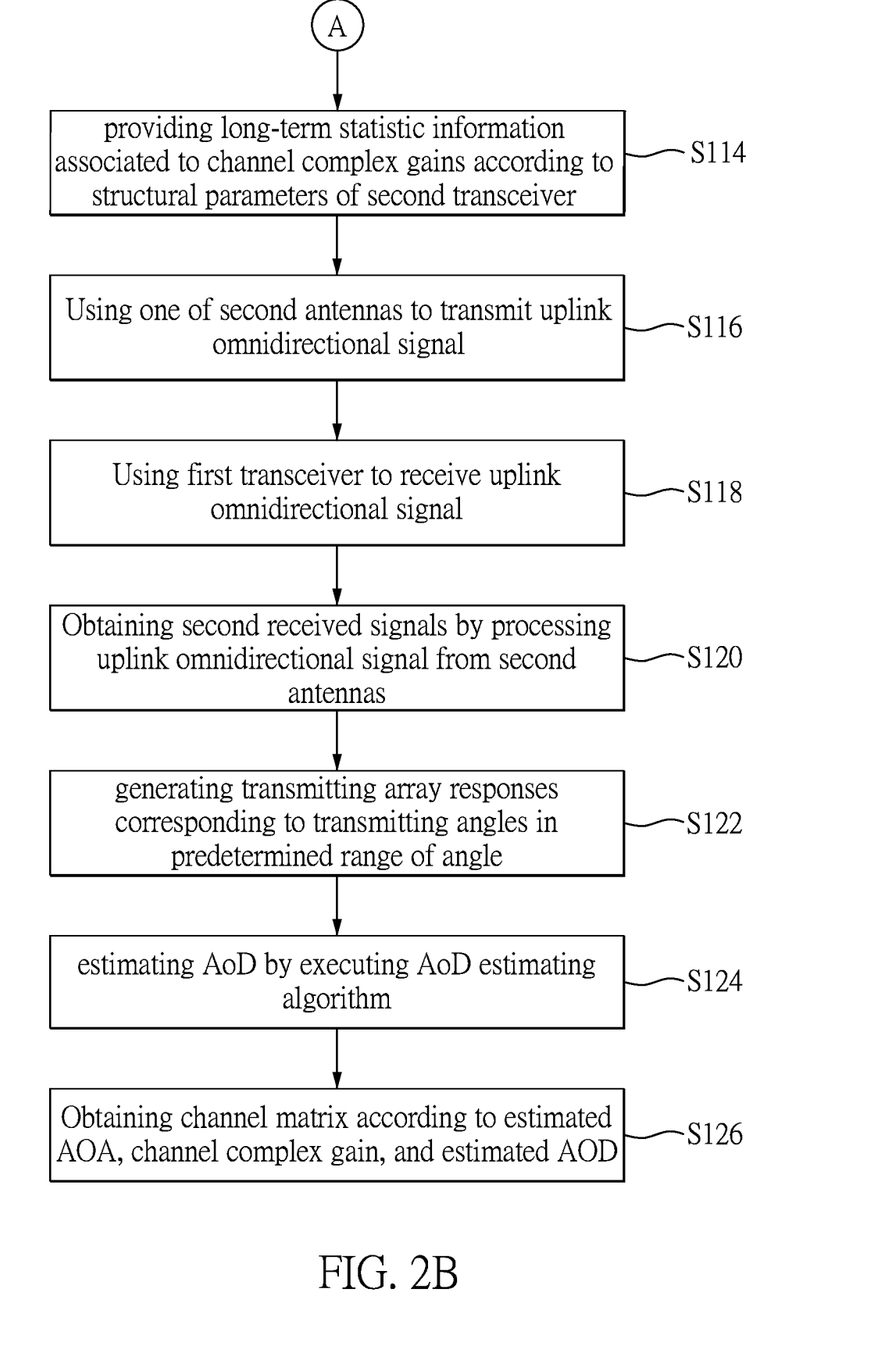

Reference is now made to FIGS. 2A and 2B, which are flowcharts of a channel estimation method according to the first embodiment of the present disclosure. In order to estimate channel model, that is, to obtain narrow-band channel matrix H, the following steps are performed:

Step S100: using one of the plurality of first antennas 100 of the first transceiver 10 to transmit a downlink omnidirectional signal. In this step, the first transceiver 10 serves as a transmitting end that performs hardware switching for a precoder to transmit a downlink omnidirectional beam to the second transceiver 12 using a single antenna, and the second transceiver 12 serves as a receiving end. In the hardware architecture in FIG. 1B, one of the first antennas 100 will be selected, and paths from the D/A converter (DAC and ADC) through the filter FT corresponding to the unselected first antennas 100 is open, thus only one first antenna 100 has an output for the analog beamformer AB, and no signals are generated by the other first antennas 100.

Step S102: using the plurality of second antennas 120 of the second transceiver 12 to receive the downlink omnidirectional signal.

Step S104: configuring the second baseband circuitry 122 to estimate channels, including the following steps:

Step S106: obtaining first received signals by processing the downlink omnidirectional signal from the plurality of second antennas. In the fully digital transceiver hardware architecture, that is, each antenna is configured with an independent RF chain and analog digital converter to the baseband end, and the received signal at the baseband end is the received signal at the antenna end, and the first received signal generated at the second transceiver 12 is represented as the following equation:

$$y=\Sigma_{i,l}\alpha_{i,l}a_r(\phi_{il})+n.$$

Where $\alpha_{i,l}$ is the channel complex gain of $l^{th}$ path in the $i^{th}$ scattering group, $\phi_{il}$ is an angle of arrival, $a_r(\phi_{il})$ is a receiving array response with $N_r \times 1$ of dimension, and n is a gauss noise with $N_r \times 1$ of dimension.

Step S108: generating a plurality of receiving array responses corresponding to receiving angles in a predetermined range of angle, respectively. In this step, the receiving end performs an arithmetic processing of the estimation work, in this case, the receiving end generates multiple receiving array responses corresponding to an angle of $\pi/2 \sim -\pi/2$, and if an angle resolution of the estimated AoA is set to $2\pi/N$, then $N^2$ array responses need to be generated.

Step S110: estimating an angle of arrival (AoA) by executing an AoA estimating algorithm.

Figure 3A:
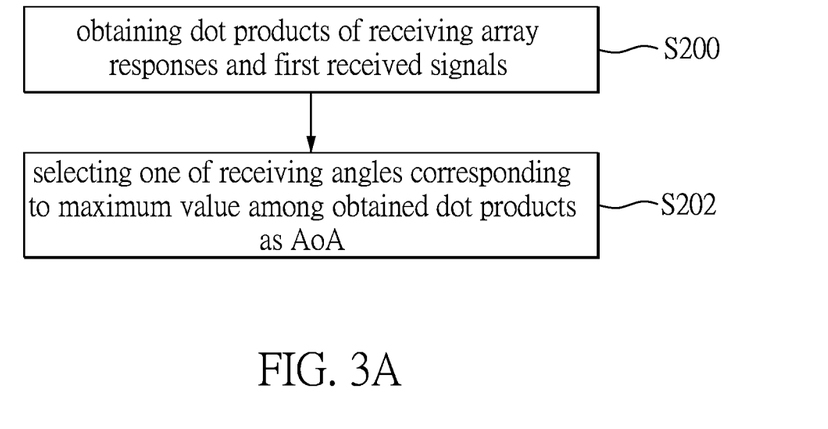
FIG. 3A is a flowchart of the AoA estimating algorithm according to the first embodiment of the present disclosure.

Reference is now made to FIG. 3A temporarily, which is a flowchart of the AoA estimating algorithm according to the first embodiment of the present disclosure. Specifically, dot products of the plurality of receiving array responses and the first received signals are respectively performed. According to a nature that the array responses are orthogonal to each other when the number of millimeter wave antennas is large enough, if an angle of the array response generated by the receiving end is not the angle of an actual channel path, the result of the dot product will approach 0, otherwise the result of the dot product will approach the complex gain of the channel path. In this regards, the AoA estimating algorithm includes the following steps:

Step 200: obtaining dot products of the plurality of receiving array responses and the first received signals, respectively.

Step 202: selecting one of the receiving angles corresponding to a maximum value among the obtained dot products as the AoA.

Further, the AoA estimating algorithm may be represented as the following equation:

$$\tilde{\phi}_{il} = \underset{\tilde{\phi}_{il}}{\operatorname{argmax}}\, a_r^H(\tilde{\phi}_{il}) y.$$

Where $\tilde{\phi}_{il}$ is the estimated angle of arrival (AoA).

Different from the existing millimeter-wave channel estimation method, in the present disclosure, the AoA can be estimated by actually transmit the set number of beams. It is not necessary to make the actual beam sweeping at the receiving end, and an ideal range can be achieved in terms of estimation accuracy.

Reference is now made back to FIG. 2A, after the estimated AoA is obtained, the channel estimation method proceeds to step S110: using a parameter-separated model to obtain channel complex gains from the first received signals.

Specifically, the present disclosure provides a parameter-separated model to represent the first received signals as the following equation:

$$y = A_r \alpha + n = A_r \begin{bmatrix} \alpha_{i,1} \\ \alpha_{i,2} \\ \vdots \\ \alpha_{i,Nray} \end{bmatrix} + n.$$

Where $A_r$ is a received array response matrix with $N_r \times N_{ray}$ of dimension, a is a vector of the channel complex gain with $N_{ray} \times 1$ of dimension, n is a vector of the gauss noise with $N_r \times 1$ of dimension.

The channel estimation method further proceeds to step S112: providing long-term statistic information associated to the channel complex gains according to structural parameters of the second transceiver 12. It should be noted that the long-term statistic information may include probability density functions, means, and variances of the channel complex gains, and these information is determined according to the structure parameters of the second transceiver 12.

Step S114: establishing a Bayesian Linear Estimator to estimate the channel complex gain. Given the long-term statistic information associated to the channel complex gains are obtained, the Bayesian Linear Estimator can be established and represented as the following equation:

$$\hat{\alpha} = \mu_\alpha + C_\alpha A_r^H (A_r C_\alpha A_r^H + C_n)^{-1} (y - A_r \mu_\alpha).$$

Wherein $\mu_\alpha$ is a mean value vector of the channel complex gain with $N_{ray} \times 1$ of dimension, $C_\alpha$ is a covariance matrix of the channel complex gain with $N_{ray} \times N_{ray}$ of dimension, $A_r$ is the received array response matrix with $N_r \times N_{ray}$ of dimension, y is a vector of the first received signal with $N_r \times 1$ of dimension. The performance of the Bayesian Linear Estimator will be affected by an accuracy of the receiving array response and a magnitude of the Gaussian noise energy. Therefore, a high signal-to-noise ratio is utilized in the first stage, i.e., the AoA estimation, and multiple sets of observation values are collected for reducing errors caused by the noise.

Next, the reciprocal nature of uplink/downlink AoA and AoD of the millimeter-wave channel are utilized, that is, the nature that an AoA of the uplink path will be equal to an AoD of the downlink path, for estimating the AoD. Therefore, the channel estimation method proceeds to step S116: configuring the second transceiver 12 to transmit an uplink omnidirectional signal with one of the plurality of second antennas 120.

Step S118: configuring the first transceiver 10 to receive the uplink omnidirectional signal.

Step S120: obtaining second received signals by processing the uplink omnidirectional signal from the plurality of first antennas 100.

Step S122: generating a plurality of transmitting array responses corresponding to transmitting angles in the determined range of angle, respectively. In this step, the first transceiver 10 serves as the receiving end that performs an arithmetic processing of the estimation work, in this case, the receiving end generates multiple transmitting array responses corresponding to an angle of $\pi/2 \sim -\pi/2$, and if an angle resolution of the estimated AoD is set to $2\pi/N$, then $N^2$ array responses need to be generated, just like the estimation of AoA.

Step S124: estimating an angle of departure (AoD) by executing an AoD estimating algorithm.

Figure 3B:
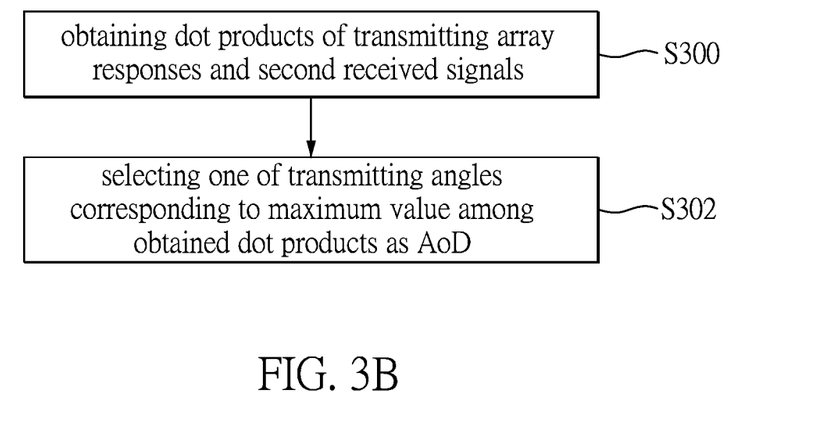
FIG. 3B is a flowchart of the AoD estimating algorithm according to the first embodiment of the present disclosure.

Reference is now made to FIG. 3B temporarily, which is a flowchart of the AoD estimating algorithm according to the first embodiment of the present disclosure. Specifically, dot products of the plurality of transmitting array responses and the second received signals are respectively performed. According to a nature that the array responses are orthogonal to each other when the number of millimeter wave antennas is large enough, if an angle of the array response generated by the receiving end is not the angle of an actual channel path, the result of the dot product will approach 0, otherwise the result of the dot product will approach the complex gain of the channel path. In this regards, the AoD estimating algorithm includes the following steps:

Step 300: obtaining dot products of the plurality of transmitting array responses and the second received signals, respectively.

Step 302: selecting one of the transmitting angles corresponding to a maximum value among the obtained dot products as the AoD.

Further, the AoD estimating algorithm may be represented as the following equation:

$$\tilde{\theta_{il}} = \underset{\theta_{il}}{\text{argsmax}}\, a_t^H(\theta_{il})y.$$

Where $\tilde{\theta_{il}}$ is the estimated angle of departure (AoD), $a_t$ is the transmitting array responses, and y is the second received signals.

The channel estimation method then proceeds to step S126: obtaining a channel matrix according to the estimated AoA, the channel complex gain, and the estimated AoD. The estimated AoA, the channel complex gain, and the estimated AoD may be introduced into the following equation to obtain the channel complex gain H:

$$H = \Sigma_{i,l}\alpha_{i,l}a_r(\phi_{il})a_t(\theta_{il})^H, [N_r, N_t] = \dim(H)$$

In the above equation, $\alpha_{il}$ is a channel complex gain of a lth path of an ith scattering group, $N_t$ is a number of the first antennas, $N_r$ is a number of the second antennas, $\phi_{il}$ is an angle of arrival (AoA), $\theta_{il}$ is an angle of departure (AoD), $a_r(\phi_{il})$ is a receiving array response, and $a_t(\theta_{il})$ is a transmitting array response, and the dimension of the $a_r(\phi_{il})$ and $a_t(\theta_{il})$ are $N_r \times 1$ and $N_t \times 1$, respectively. Therefore, the channel may be estimated by utilizing the channel estimation method and system.

From above, the present disclosure provides a channel estimation system and method thereof, using the nature of the millimeter-wave channel with sparse paths, the channel estimation problem is transformed from estimating the entire channel matrix to estimating independent parameters of the millimeter-wave channel. These parameters are angle of arrival (AoA) and angle of departure (AoD), and complex gain of the channel paths.

Furthermore, the present disclosure provides a mathematical estimation model of separate parameters, which separates each parameter into an independent estimation type, that is, different parameters are not estimated in one stage, but are independently estimated in three stages, the first stage is to estimate the AoA of the channel, the second stage is to estimate the complex gain of the downstream channel path, and the last phase to estimate the AoD. By using the mathematical estimation model of separate parameters, the error of the joint estimation parameter can be avoided. In each stage, if the transmitted signal is adjusted by the appropriate signal-to-noise ratio (SNR Ratio), the estimation error of the channel parameters can be reduced to the ideal range. Furthermore, in order to save time of estimation, the present disclosure utilizes the reciprocal nature of uplink/downlink AoA and AoD of the millimeter-wave channel, that is, the AoA of uplink is the AoD of downlink, thereby reducing the amount of observational data to be collected and reducing the time spent on training.

In addition, the present disclosure designs the Bayesian Estimator by using the long-term statistic of channel path gain, and calculates the observational value by using back-end of the receiver, such that the feedback number of channel information can be effectively reduced to shorten the channel estimation time.

Second Embodiment

Figure 4:
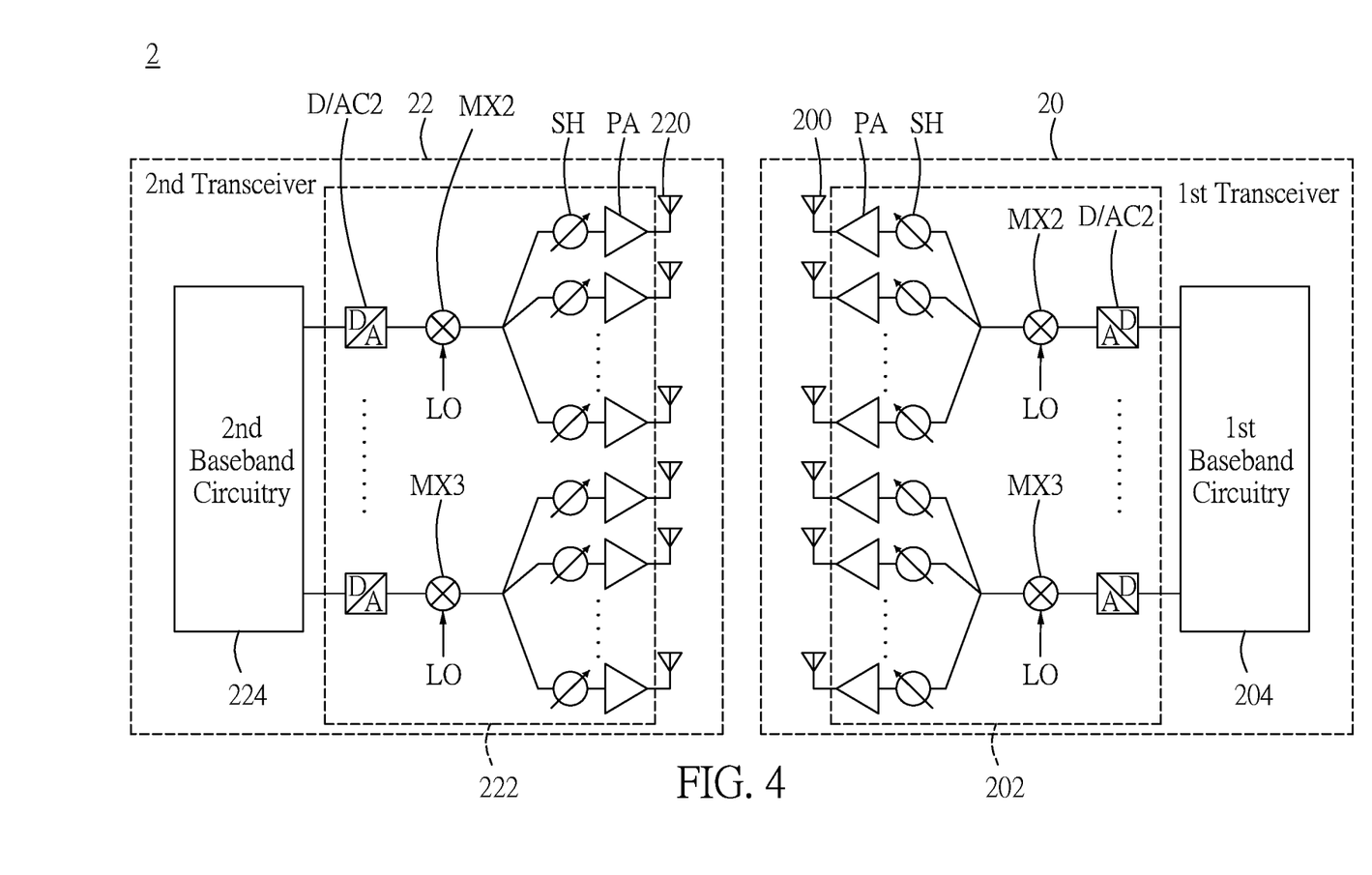
FIG. 4 is a block diagram of a RF chain circuit of a channel estimation system according to a second embodiment of the present disclosure.

Reference is now made to FIG. 4, which is a block diagram of a RF chain circuit of a channel estimation system according to a second embodiment of the present disclosure.

As shown in FIG. 4, the second embodiment of the present disclosure provides a channel estimation system 2 including a first transceiver 20 and a second transceiver 22. The first transceiver 20 includes a plurality of first antennas 200, a first RF chain circuit 202, and a first baseband circuitry 204, and the first RF chain circuit 202 is coupled to the plurality of first antennas 200 and the first baseband circuitry 204. Similarly, the second transceiver 12 includes a plurality of second antennas 120, a second RF chain circuit 222 and a second baseband circuitry 224, and the second RF chain circuit 222 is coupled to the plurality of second antennas 220 and the second baseband circuitry 224.

In the fully digital architecture of the first embodiment, large numbers of antenna elements are provided a, the transmitting end and the receiving end, each antenna is equipped with a set of independent RF chains and digital analog converter (D/A converter), so as to achieve fully digital beamforming. However, large number of RF chains and D/A converters will greatly increase the hardware cost of the system. Therefore, the millimeter wave communication system may utilize Hybrid beamforming architecture. The number of RF chains and D/A converters in this architecture is much smaller than the number of antennas, and each antenna is equipped with a phase shifter, and the hybrid hardware architecture may be used to save costs, while approaching the fully digital beamforming technology. The hybrid system is quite different from the existing fully digital beamforming architecture, and thus different approach need be utilized in processing channel estimation.

Specifically, the first RF chain circuit 202 for the hybrid architecture includes a plurality amplifiers PA respectively coupled to the plurality of first antennas 200, a plurality of phase shifters SH respectively coupled to the plurality amplifiers PA, a second mixer MX2 coupled to the first group of the amplifiers PA, a third mixer MX3 coupled to the second group of the amplifiers PA, a plurality of second D/A converter D/AC2 respectively coupled to the second mixer MX2, the third mixer MX3 and the first baseband circuitry 204. The second RF chain circuit 220 includes a plurality amplifiers PA, a plurality of phase shifters SH, a second mixer MX2, a third mixer MX3, a plurality of second D/A converters D/AC2, and may have similar structure as the first RF chain circuit 202, thus the repeated descriptions are omitted for clarify.

In the hybrid architecture, the same group of RF chains and D/A converters D/AC2 are shared between the antennas. In order for the first transceiver 20 and the second transceiver 22 of the hybrid architecture to obtain the same received signal as the full digital architecture, a receiving end must be designed as a vector with only one unit being 1 and the remaining units being 0, and this must be achieved by utilizing a chip with adjustable gain value. The phase shifter SH in the present embodiment may be provided with a gain controller for adjusting a gain of the received signal. In this case, the gain value of one of the antennas is set to a maximum value defined according to the specification of the gain controller, and the gain of the remaining antennas is designed as a minimum value defined according to the specification of the same.

Therefore, if the vector Wj is continuously adjusted while receiving the signals for $N_r$ times, the received signals like the fully digital architecture can be obtained. The received signal is further represented by the following equation:

$$y_j = W_j^H\left[\sum_{i,l}\alpha_{i,l}a_r(\phi_{il}) + n\right], j = 1, 2, \ldots, N_r$$

Where $N_r$ is the number of the second antennas, $W_j$ is vector of gains of the plurality of phase shifters, and the vector $W_j$ of gains of the phase shifters SH may be further represented by the following equation:

$$W_j = [0, 0, \ldots 0, 1, 0, \ldots, 0]^T, \quad W(k) = \begin{cases} 0, k \neq j \\ 1, k = j \end{cases}. \quad (8)$$

After receiving the signal for N times in this way, the receiving signals like the fully digital architecture can be obtained at the baseband end, and the hybrid hardware architecture may be used to save costs, while approaching the fully digital beamforming technology.

Third Embodiment

Simulations for the baseband end in the channel estimation system are performed, and the measure of the estimator's performance is measured by the mean square error between the estimated parameters and the actual channel parameters. Since Gaussian noise may exist between the signals transmitted in the channel, multiple repeated training beams are transmitted to collect the observation values to reduce the error, and the average observation value is obtained for eliminating noise. In the simulation, the number of observation beams is set to 15, 20, and 25 times respectively. The simulation results of the three-stage estimation channel parameter method in the present disclosure are respectively illustrated below.

Figure 5:
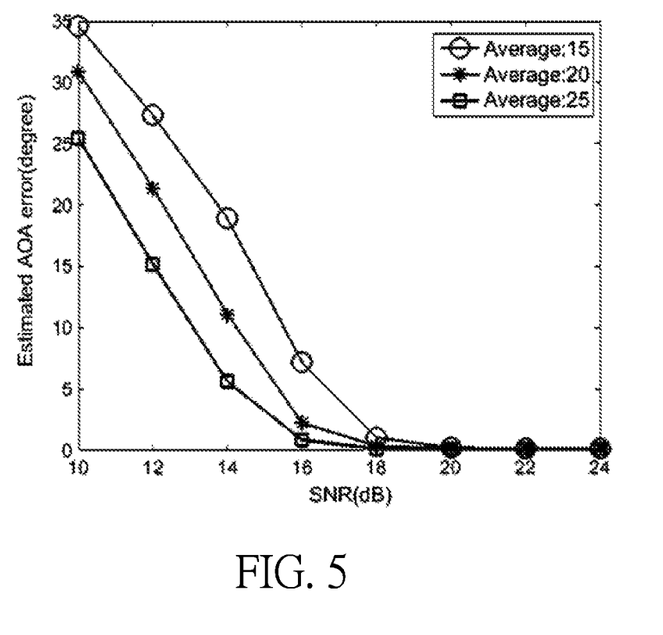
FIG. 5 is a simulation result of estimation performance for the downlink AoA according to the present disclosure.

Reference is now made to FIG. 5, which is a simulation result of estimation performance for the downlink AoA according to the present disclosure. In this example, the difference between the estimated AoA and the actual AoA for each signal-to-noise ratio is shown. The parameters of the simulation are set to 128 antennas on the transmitting end, 64 antennas on the receiving end, and two clusters in the millimeter-wave channel. There is one path in each of the clusters.

It can be seen from FIG. 5 that when the signal-to-noise ratio reaches more than 20 dB, the estimation method can approximate the estimation error of the AoA to less than 0.1 degrees, and the more the number of transmitted beams, an ideal estimation performance can be achieved at lower signal-to-noise ratio.

Figure 6:
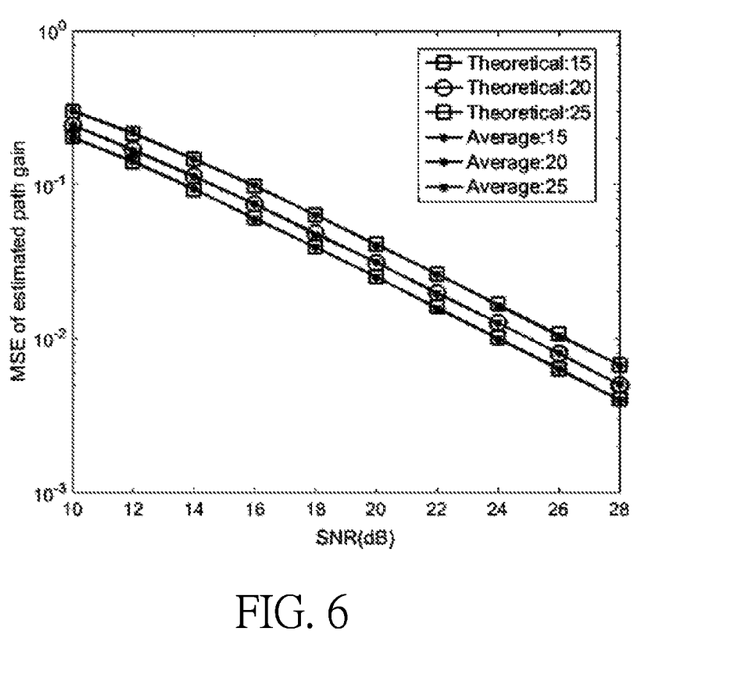
FIG. 6 is a simulation result of estimation performance for the downlink channel complex gain according to the present disclosure.

Reference is now made to FIG. 6, which is a simulation result of estimation performance for the downlink channel complex gain according to the present disclosure. In this example, the estimation performance of the channel complex gain for various of signal-to-noise ratio is shown. The parameters of the simulation are set to 128 antennas on the transmitting end, 64 antennas on the receiving end, and two clusters in the millimeter-wave channel, and there is one path in each of the clusters. The probability density function of the channel path is complex Gaussian with a variation value of 1, and the source of the observation data is the observation data of AoA estimation method in the first stage. In addition, the model needs the AoA value estimated in the first stage to assist the estimation.

It can be seen from FIG. 6 that when the signal-to-noise ratio is above 24 dB, the mean square error of the channel complex gain can be estimated to be less than $10^{-2}$ (equals to 20 dB), and all of the simulated curves are close to the theoretical value, almost overlapped with each other, which verifies the correctness of the simulation.

Figure 7:
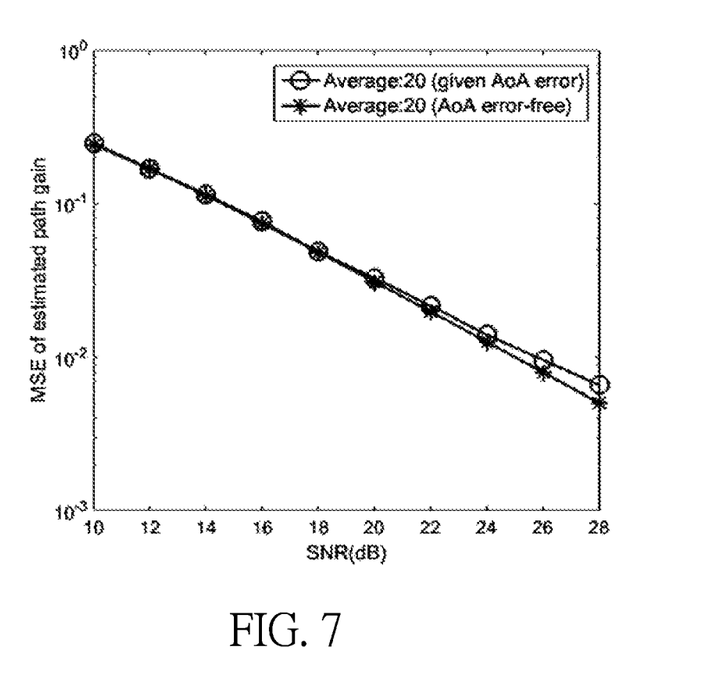
FIG. 7 is a performance result of the estimator after the AoA error is estimated in the first stage.

Reference is now made to FIG. 7, which is a performance result of the estimator after the AoA error is estimated in the first stage. The AoA estimation error set in the simulation is a Gaussian random variable with an average of 0.05 degrees. This value is equivalent to the estimated corresponding to 22 dB of the signal-to-noise ratio of the estimation in the first stage.

From the simulation result, it can be seen that when the average number of transmitted beams is 20, the mean difference between the channel gain estimator and the AoA-free estimation error estimator after 20 dB will gradually increase, if it is assumed that the target value that the mean square difference is $10^{-2}$ needs to be achieved, the signal-to-noise ratio needs to be increased by 2 dB.

Figure 8:
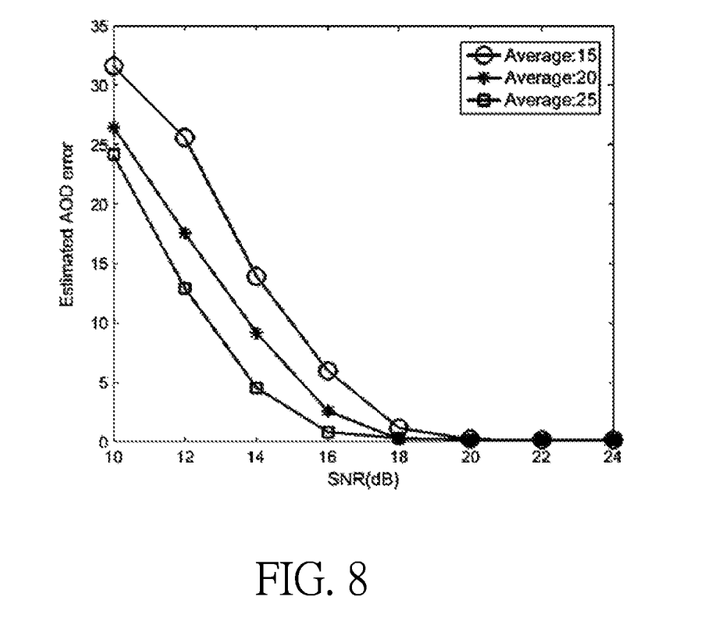
FIG. 8 is a simulation result of estimation performance for the downlink AoD according to the present disclosure.

Reference is now made to FIG. 8, which is a simulation result of estimation performance for the downlink AoD according to the present disclosure. In this example, the estimated performance of AoD for various signal-to-noise ratios are shown. The parameters of the simulation are set to 128 antennas on the transmitting end, 64 antennas on the receiving end, and two clusters in the millimeter-wave channel. There is one path in each of the clusters, and the source of the observation data is that after the receiving end uses the hardware switching, the single antenna is used to make the omnidirectional beam to the transmitting end. In addition, the receiving end will output beams corresponding to an average number to eliminate the channel noise.

It can be seen from FIG. 8 that the simulation results are similar to those of the first-stage estimated AoA, because the algorithms of the two estimators are the same. However, the estimated performance of AoD is higher than that of the estimated AoA since the number of the transmitting antenna is larger than that of the receiving end. According to the nature that the array responses are orthogonal to each other when the number of millimeter wave antennas is large enough, thus the non-zero error caused by the previous path between two of estimation stages can be eliminated.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A channel estimation system, comprising:
   a first transceiver, including a first baseband circuitry and a plurality of first antennas, configured to transmit a downlink omnidirectional signal with one of the plurality of first antennas;
   a second transceiver, including:
   a plurality of second antennas, configured to receive the downlink omnidirectional signal;
   a RF chain circuit coupled to the plurality of first antennas;
   a second baseband circuitry, coupled to the RF chain circuit, wherein the first baseband circuitry and the second baseband circuitry are configured to estimate channels by performing the following steps:

obtaining first received signals by processing the downlink omnidirectional signal from the plurality of second antennas, generating a plurality of receiving array responses corresponding to receiving angles in a determined range of angle, respectively;

estimating an angle of arrival (AoA) by executing an AoA estimating algorithm, wherein the AoA estimating algorithm comprising:

obtaining dot products of the plurality of receiving array responses and the first received signals, respectively; and selecting one of the receiving angles corresponding to a maximum value among the obtained dot products as the AoA;

using a parameter-separated model to obtain channel complex gains from the first received signals;

providing long-term statistic information associated to the channel complex gains according to structural parameters of the second transceiver;

establishing a Bayesian Linear Estimator to estimate the channel complex gain;

configuring the second transceiver to transmit an uplink omnidirectional signal with one of the plurality of second antennas;

configuring the first transceiver to receive the uplink omnidirectional signal;

obtaining second received signals by processing the downlink omnidirectional signal from the plurality of second antennas, generating a plurality of transmitting array responses corresponding to transmitting angles in the determined range of angle, respectively;

estimating an angle of departure (AoD) by executing an AoD estimating algorithm, wherein the AoD estimating algorithm comprising:

obtaining dot products of the plurality of transmitting array responses and the second received signals, respectively; and selecting one of the transmitting angles corresponding to a maximum value among the obtained dot products as the AoD; and obtaining a channel matrix according to the estimated AoA, the channel complex gain, and the estimated AoD.

2. The channel estimation system according to claim 1, wherein the first received signal is represented as an equation (1):

$$y=\Sigma_{i,l}\alpha_{i,l}a_r(\phi_{il})+n \quad (1),$$

wherein $\alpha_{i,l}$ is a channel complex gain, $\phi_{il}$ is an angle of arrival, $a_r(\phi_{il})$ is a receiving array response, and n is a Gaussion noise.

3. The channel estimation system according to claim 2, wherein the AoA estimating algorithm is represented as an equation (2):

$$\widehat{\phi_{il}} = \underset{\widetilde{\phi_{il}}}{\mathrm{argsmax}}\ a_r^H(\widetilde{\phi_{il}})y(2),$$

wherein $\widehat{\phi_{il}}$ is the estimated angle of arrival.

4. The channel estimation system according to claim 2, wherein the AoD estimating algorithm is represented as an equation (5):

$$\widehat{\theta_{il}} = \underset{\widetilde{\theta_{il}}}{\mathrm{argsmax}}\ a_t^H(\widetilde{\theta_{il}})y(5),$$

wherein $\widehat{\theta_{il}}$ is the estimated angle of departure, $a_t$ is transmitting array response, and y is the second received signal.

5. The channel estimation system according to claim 1, wherein the parameter-separated model is represented as an equation (3):

$$y=A_r\alpha+n \quad (3),$$

wherein $A_r$ is a received array response matrix, $\alpha$ is a vector of the channel complex gain, n is a vector of the Gaussian noise.

6. The channel estimation system according to claim 5, wherein the Bayesian Linear Estimator is represented by an equation (4):

$$\hat{\alpha}=\mu_\alpha+C_\alpha A_r^H(A_r C_\alpha A_r^H+C_n)^{-1}(y-A_r\mu_\alpha) \quad (4);$$

wherein $\mu_\alpha$ is mean value vector of the channel complex gain, $C_\alpha$ is a covariance matrix of the channel complex gain, $A_r$ is the received array response matrix, y is a vector of the first received signal.

7. The channel estimation system according to claim 1, wherein the channel matrix is represented by an equation (6):

$$H=\Sigma_{i,l}\alpha_{i,l}a_r(\phi_{il})a_t(\theta_{il})^H,\ [N_r,N_t]=\dim(H) \quad (6),$$

wherein $\alpha_{il}$ is the channel complex gain of a lth path of an ith scattering group, $N_t$ is a number of the first antennas, $N_r$ is a number of the second antennas, $\phi_{il}$ is the AoA, $\theta_{il}$ is the AoD, $a_r(\phi_{il})$ is the receiving array response, and $a_t(\theta_{il})$ is the transmitting array response.

8. The channel estimation system according to claim 1, wherein the RF chain circuit comprising:

a plurality RF chain units coupled between the second baseband circuitry and the plurality of second antennas, wherein each of the RF chain units including:

an amplifier coupled to one of the second antennas;

a first mixer coupled to the amplifier; and a first digital/analog (D/A) converter coupled to the first mixer and the second baseband circuitry.

9. The channel estimation system according to claim 1, wherein the RF chain circuit comprising:

a plurality amplifiers respectively coupled to the plurality of second antennas;

a plurality of phase shifters respectively coupled to the plurality amplifiers;

a second mixer coupled to the first group of the amplifiers;

a third mixer coupled to the second group of the amplifiers; and a plurality of second D/A respectively coupled to the second mixer, the third mixer and the second baseband circuitry.

10. The channel estimation system according to claim 9, further comprising a gain controller for respectively controlling gains of the plurality of phase shifters, wherein the received signal is further represented by an equation (7):

$$y_j=W_j^H[\Sigma_{i,l}\alpha_{i,l}a_r(\phi_{il})+n],\ j=1,2,\ldots,N_r \quad (7)$$

wherein Nr is the number of the second antennas, Wj is vector of gains of the plurality of phase shifters, wherein Wj is further represented by an equation (8):

$$W_j = [0, 0, \ldots 0, 1, 0, \ldots, 0]^T, W(k) = \begin{cases} 0, k \neq j \\ 1, k = j \end{cases} \quad (8)$$

11. The channel estimation system according to claim 1, wherein the long-term statistic information associated to the channel complex gain includes probability density functions, mean values, variance values of the channel complex gain.

12. The channel estimation system according to claim 1, wherein a dimension of the transmitting array response is $N_t \times 1$, and a dimension of the receiving array response is $N_r \times 1$, where $N_t$ is the number of the first antennas, $N_r$ is the number of the second antennas.

13. The channel estimation system according to claim 1, wherein the channel matrix consists of $N_{cl}$ scattering groups, and each of the $N_{cl}$ scattering groups consists of $N_{ray}$ transmission paths, and the equation (3) is further represented by an equation (9):

$$y = A_r\alpha + n = A_r \begin{bmatrix} \alpha_{i,1} \\ \alpha_{i,2} \\ \vdots \\ \alpha_{i,N_{ray}} \end{bmatrix} + n \quad (9)$$

wherein $A_r$ is the receiving array response matrix with a dimension of $N_r \times N_{ray}$, $\alpha$ is the vector of the channel complex gain with a dimension of $N_{ray} \times 1$, and n is a vector of the gauss noise with a dimension of $N_r \times 1$.

14. A channel estimation method, comprising:
configuring a plurality of first antennas of a first transceiver to transmit a downlink omnidirectional signal with one of the plurality of first antennas, wherein the first transceiver further includes a first baseband circuitry;
configuring a plurality of second antennas of a second transceiver to receive the downlink omnidirectional signal, wherein the second transceiver further includes a RF chain circuit coupled to the plurality of first antennas, and a second baseband circuitry coupled to the RF chain circuit;
configuring the first baseband circuitry and the second baseband circuitry to estimate channels by performing the following steps:
obtaining first received signals by processing the downlink omnidirectional signal from the plurality of second antennas,
generating a plurality of receiving array responses corresponding to receiving angles in a determined range of angle, respectively;
estimating an angle of arrival (AoA) by executing an AoA estimating algorithm, wherein the AoA estimating algorithm comprising:
obtaining dot products of the plurality of receiving array responses and the first received signals, respectively; and
selecting one of the receiving angles corresponding to a maximum value among the obtained dot products as the AoA;
using a parameter-separated model to obtain channel complex gains from the first received signals;
providing long-term statistic information associated to the channel complex gains according to structural parameters of the second transceiver;
establishing a Bayesian Linear Estimator to estimate the channel complex gain;
configuring the second transceiver to transmit an uplink omnidirectional signal with one of the plurality of second antennas;
configuring the first transceiver to receive the uplink omnidirectional signal;
obtaining second received signals by processing the downlink omnidirectional signal from the plurality of second antennas,
generating a plurality of transmitting array responses corresponding to transmitting angles in the determined range of angle, respectively;
estimating an angle of departure (AoD) by executing an AoD estimating algorithm, wherein the AoD estimating algorithm comprising:
obtaining dot products of the plurality of transmitting array responses and the second received signals, respectively; and
selecting one of the transmitting angles corresponding to a maximum value among the obtained dot products as the AoD; and
obtaining a channel matrix according to the estimated AoA, the channel complex gain, and the estimated AoD.

15. The channel estimation method according to claim 14, wherein the first received signal is represented as an equation (1):

$$y = \sum_{i,l} \alpha_{i,l} a_r(\phi_{il}) + n \quad (1),$$

wherein $\alpha_{i,l}$ is a channel complex gain, $\phi_{il}$ is an angle of arrival, $a_r(\phi_{il})$ is a receiving array response, and n is a Gaussian noise.

16. The channel estimation method according to claim 15, wherein the AoA estimating algorithm is represented as an equation (2):

$$\hat{\phi}_{il} = \underset{\phi_{il}}{\operatorname{argmax}}\, a_r^H(\hat{\phi}_{il}) y (2),$$

wherein $\hat{\phi}_{il}$ is the estimated angle of arrival.

17. The channel estimation method according to claim 15, wherein the AoD estimating algorithm is represented as an equation (5):

$$\hat{\theta}_{il} = \underset{\theta_{il}}{\operatorname{argmax}}\, a_t^H(\theta_{il}) y (5),$$

wherein $\hat{\theta}_{il}$ is the estimated angle of departure, $a_t$ is transmitting array response, and y is the second received signal.

18. The channel estimation method according to claim 14, wherein the parameter-separated model is represented as an equation (3):

$$y = A_r\alpha + n \quad (3),$$

wherein $A_r$ is a received array response matrix, $\alpha$ is a vector of the channel complex gain, n is a vector of the gauss noise.

19. The channel estimation method according to claim 18, wherein the Bayesian Linear Estimator is represented by an equation (4):

$$\hat{\alpha} = \mu_\alpha + C_\alpha A_r^H (A_r C_\alpha A_r^H + C_n)^{-1}(y - A_r \mu_\alpha) \quad (4);$$

wherein $\mu_\alpha$ is mean value vector of the channel complex gain, $C_\alpha$ is a covariance matrix of the channel complex gain, $A_r$ is the received array response matrix, y is a vector of the first received signal.

20. The channel estimation method according to claim 14, wherein the channel matrix is represented by an equation (6):

$$H=\Sigma_{i,l}\alpha_{i,l}a_r(\phi_{il})a_t(\theta_{il})^H,\ [N_r,N_t]=\dim(H) \qquad (6),$$

wherein $\alpha_{il}$ is the channel complex gain of a lth path of an ith scattering group, $N_t$ is a number of the first antennas, $N_r$ is a number of the second antennas, $\phi_{il}$ is the AoA, $\theta_{il}$ is the AoD, $a_r(\phi_{il})$ is the receiving array response, and $a_t(\theta_{il})$ is the transmitting array response.

21. The channel estimation method according to claim 14, wherein the RF chain circuit comprising:
 a plurality RF chain units coupled between the second baseband the plurality of second antennas, wherein each of the RF chain units including:
 an amplifier coupled to one of the second antennas;
 a first mixer coupled to the the amplifier; and
 a first digital/analog (D/A) converter coupled to the first mixer and the second baseband circuitry.

22. The channel estimation method according to claim 14, wherein the RF chain circuit comprising:
 a plurality amplifiers respectively coupled to the plurality of second antennas;
 a plurality of phase shifters respectively coupled to the plurality amplifiers;
 a second mixer coupled to the first group of the amplifiers;
 a third mixer coupled to the second group of the amplifiers; and
 a plurality of second D/A converter respectively coupled to the second mixer, the third mixer and the second baseband circuitry.

23. The channel estimation method according to claim 22, further comprising a gain controller for respectively controlling gains of the plurality of phase shifters, wherein the received signal is further represented by an equation (7):

$$y_j=W_j^H[\Sigma_{i,l}\alpha_{i,l}a_r(\phi_{il})+n],\ j=1,2,\ldots,N_r \qquad (7)$$

wherein $N_r$ is the number of the second antennas, $W_j$ is vector of gains of the plurality of phase shifters, wherein $W_j$ is further represented by an equation (8):

$$W_j = [0, 0, \ldots 0, 1, 0, \ldots, 0]^T,\ W(k) = \begin{cases} 0, k \neq j \\ 1, k = j \end{cases}. \qquad (8)$$

24. The channel estimation method according to claim 14, wherein the long-term statistic information associated to the channel complex gain includes probability density functions, mean values, variance values of the channel complex gain.

25. The channel estimation method according to claim 14, wherein a dimension of the transmitting array response is $N_t \times 1$, and a dimension of the receiving array response is $N_r \times 1$, where $N_t$ is the number of the first antennas, $N_r$ is the number of the second antennas.

26. The channel estimation method according to claim 14, wherein the channel matrix consists of $N_{cl}$ scattering groups, and each of the $N_{cl}$ scattering groups consists of $N_{ray}$ transmission paths, and the equation (3) is further represented by an equation (9):

$$y = A_r\alpha + n = A_r \begin{bmatrix} \alpha_{i,1} \\ \alpha_{i,2} \\ \vdots \\ \alpha_{i,N_{ray}} \end{bmatrix} + n \qquad (9)$$

wherein $A_r$ is the receiving array response matrix with a dimension of $N_r \times N_{ray}$, $\alpha$ is the vector of the channel complex gain with a dimension of $N_{ray} \times 1$, and n is a vector of the gauss noise with a dimension of $N_r \times 1$.

* * * * *